March 8, 1955 — J. H. REID — 2,703,499
IRREVERSIBLE LOCKING CONTROL ELEMENT
Filed Feb. 29, 1952 — 4 Sheets-Sheet 1
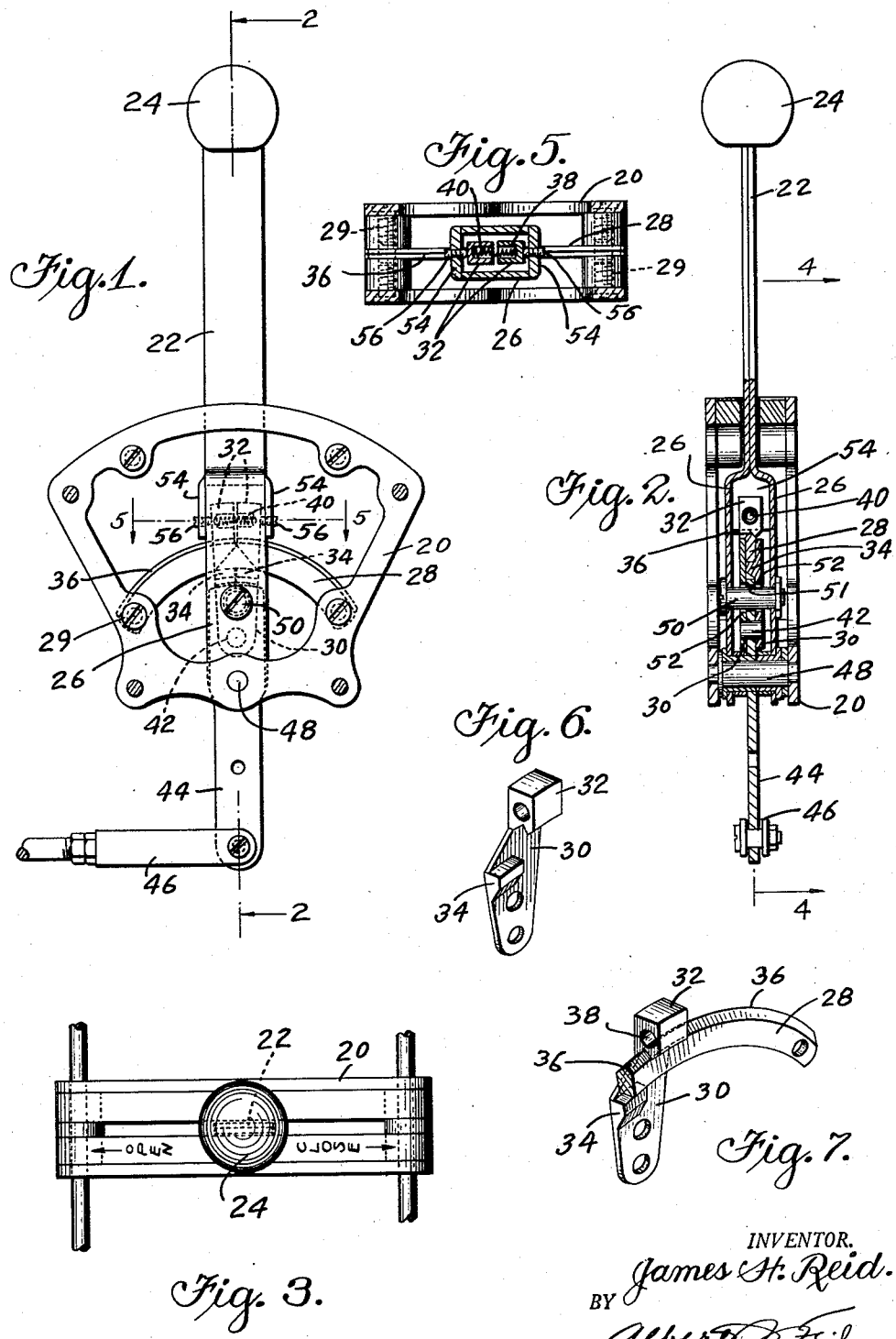
INVENTOR.
James H. Reid.
BY Albert J. Fihe
ATTORNEY.

March 8, 1955   J. H. REID   2,703,499
IRREVERSIBLE LOCKING CONTROL ELEMENT
Filed Feb. 29, 1952   4 Sheets-Sheet 2

INVENTOR.
James H. Reid.
BY
Albert J. Fihe
ATTORNEY.

March 8, 1955  J. H. REID  2,703,499
IRREVERSIBLE LOCKING CONTROL ELEMENT
Filed Feb. 29, 1952  4 Sheets-Sheet 3
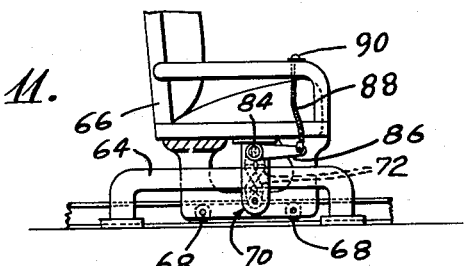
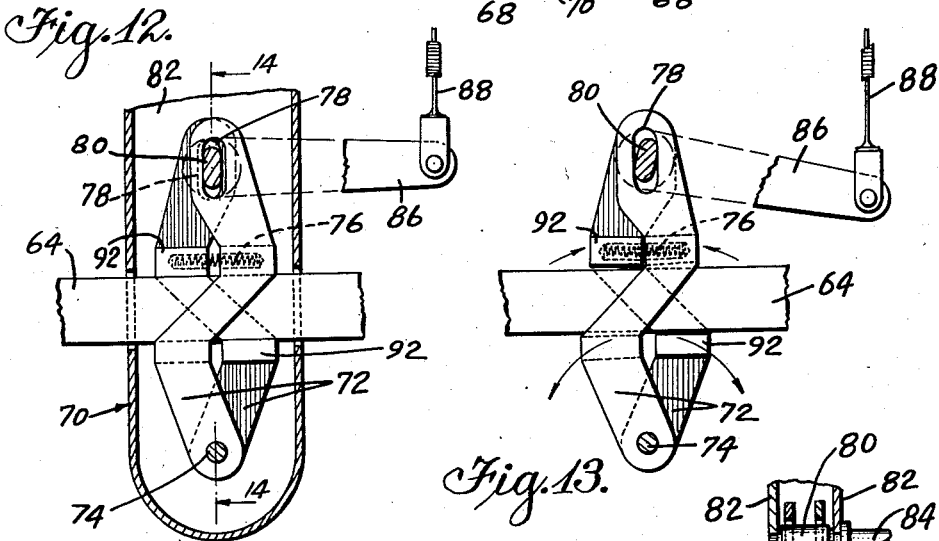
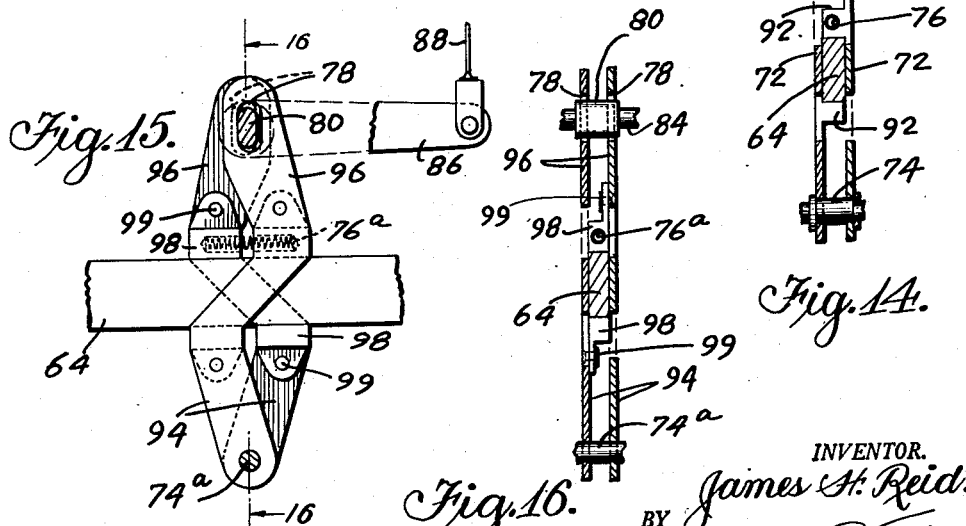
INVENTOR.
James H. Reid.
BY
ATTORNEY.

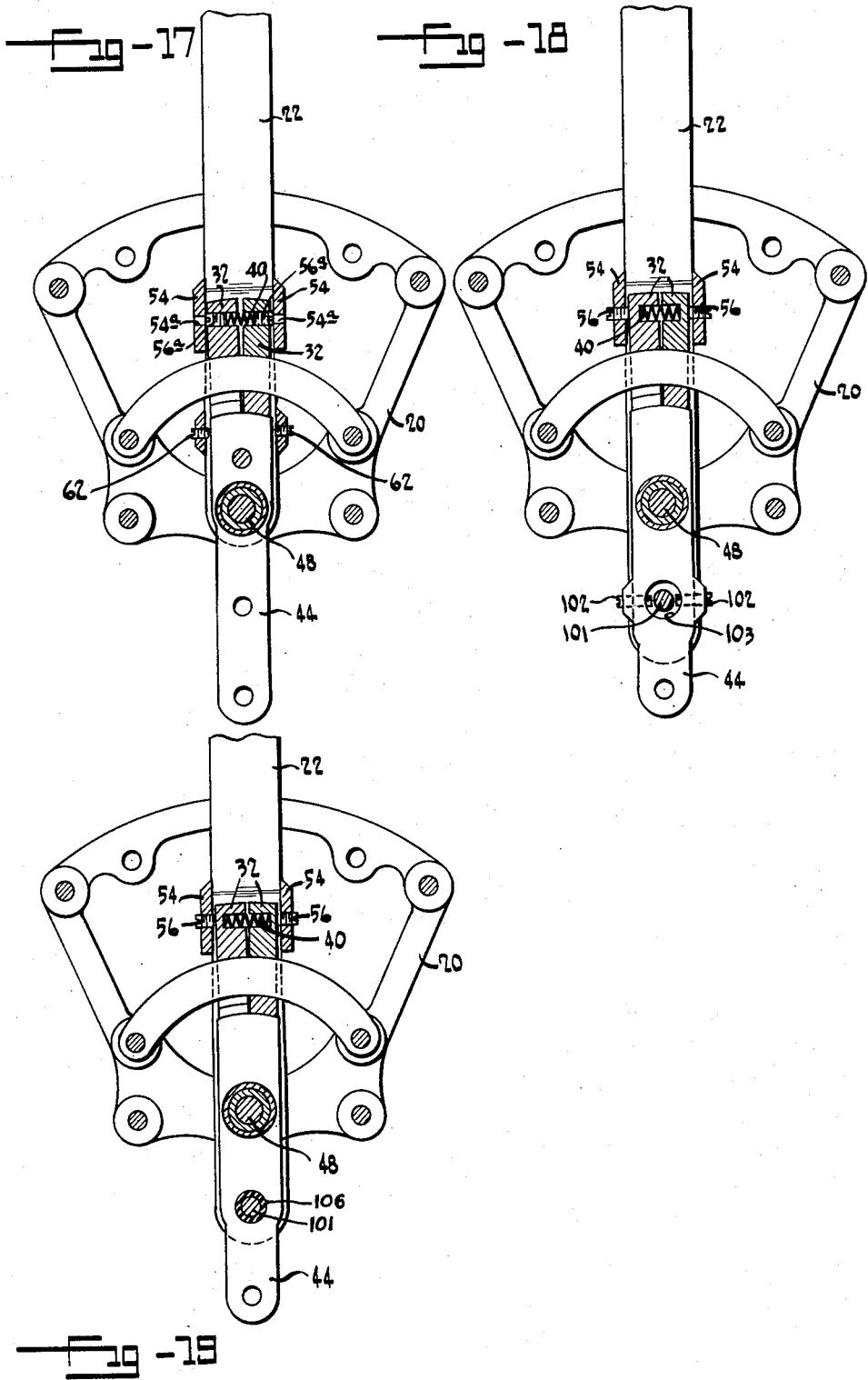

United States Patent Office 2,703,499
Patented Mar. 8, 1955

2,703,499

IRREVERSIBLE LOCKING CONTROL ELEMENT

James H. Reid, Burbank, Calif., assignor to Reid Engineering Company, Burbank, Calif., a partnership Application February 29, 1952, Serial No. 274,223

17 Claims. (Cl. 74—531)

This invention relates to an improved irreversible locking control element and has, for one of its principal objects the provision of a control element which can be employed in numerous and varied embodiments and which, when once set in position, will maintain that position regardless of the point of application of such forces with the exception, of course, of forces properly applied according to the design of the apparatus to produce an effective resultant movement.

One of the important objects of this invention is to provide a control element which can be incorporated into the throttle lever for operating an airplane engine and which will, when once set in position for a desired speed of the engine, maintain that position and speed regardless of outside influences such as vibration, while at the same time the throttle lever can be immediately and easily moved to another position by the proper application of a force upon it according to design.

Another important object of the invention resides in the provision of a locking control element which can be installed in an adjustable seat for airplanes or automobiles and which, when once set, cannot be moved by any exterior force except that applied to the control element in the designed conventional manner.

Varied and various applications of the invention can be incorporated into numerous structures whenever it is found necessary to install a device which is capable of being readily shifted from one position to another at the desire of the operator and which will remain in that position regardless of other exterior forces until such time as the operator shifts the control lever himself.

Other and further important objects of the invention will be apparent from the disclosures in the accompanying drawings and following specification.

The invention, in a preferred form, is illustrated in the drawings and hereinafter more fully described.

In the drawings:

Figure 1 is a front elevation of the improved irreversible locking control element of this invention, showing the same as applied to a throttle control used in airplane engines. This represents what may be designated as the pin drive construction.

Figure 2 is a sectional view taken on the line 2—2 of Figure 1, looking in the direction indicated by the arrows.

Figure 3 is a top plan view of the device illustrated in Figure 1.

Figure 5 is an enlarged horizontal sectional view taken on the line 5—5 of Figure 1.

Figure 6 is a detailed perspective view showing one of the locking elements which act to provide the irreversible locking feature.

Figure 7 is a perspective view showing the lock element of Figure 6 as associated with an arcuate track or similar structure over which the locking elements move.

Figure 11 is a side elevation of a representative airplane or automobile seat or some similar structure showing a straight line application of the locking elements.

Figure 12 is an enlarged detail view of the locking element construction of the device of Figure 11, and showing the same in locked position.

Figure 13 is a view similar to that of Figure 12, but showing the apparatus in unlocked position.

Figure 14 is a vertical section taken on the line 14—14 of Figure 12.

Figure 15 illustrates a still further modification of the invention, wherein self-aligning three-part lock elements are provided.

Figure 16 is a sectional view taken on the line 16—16 of Figure 15, looking in the direction indicated by the arrows.

Fig. 17 is a view similar to Figs. 4, 9 and 10 which shows a further modified form wherein the drive is through adjustable set screws in the blocks or shoes.

Fig. 18 is a view similar to Fig. 17 showing still a further modification.

Fig. 19 is a view similar to Fig. 17 showing another modification.

As shown in the drawings:

Figure 4:
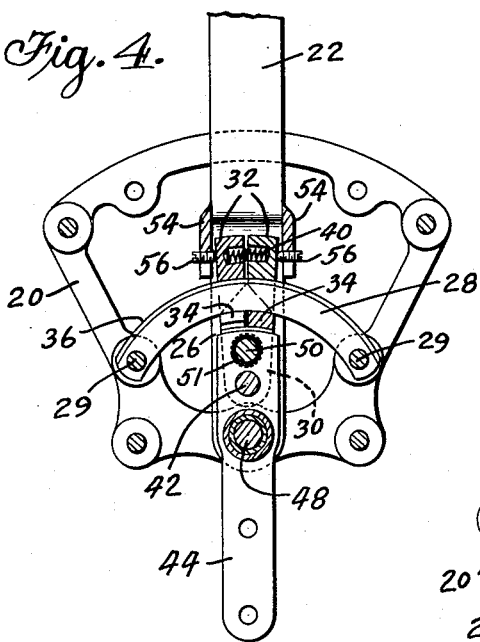
Figure 4 is a vertical plan view, parts being broken away, showing the movement through lock elements.

The reference numeral 20 indicates generally a supporting frame for the irreversible locking control apparatus of this invention. As shown, it represents a portion of a conventional support employed in connection with airplanes.

The lever of the device is indicated at 22, and a conventional knob 24 for manual control is employed. The frame 20 includes indicia showing open and closed positions of the lever, as illustrated in Figure 3.

As best shown in Figure 2, the control lever 22 is preferably composed of two associated elements and is bifurcated at its lower end, these bifurcations being indicated by the reference numeral 26.

Positioned between the bifurcations is an arcuate element or quadrant 28, which is supported by screws, bolts or pins 29, mounted in the frame 20.

Adapted to ride upon the arcuate element or quadrant 28, is a pair of identical locking elements 30, shaped as shown in Figures 6 and 7, each element having a block shaped shoe 32 and an integral medial lateral extension or shoe 34. These locking elements are to be applied in juxtaposed relationship to the quadrant 28. Such relationship of the assembled parts is best shown in Figures 2, 4, 9 and 10.

The arcuate element or quadrant 28 is provided with a ridged portion extending along the periphery of its upper edge as shown at 36 in Figure 7, and the block-like shoes 32 of the elements 30 are each angularly recessed to receive and freely ride upon this ridge. This prevents accidental lateral movement. The bottom face of the arcuate member 28 is flat and the upper faces of the integral shoes 34 of the elements 30 are likewise flat. A cylindrical recess is formed in each of the block-like shoes 32 of each of the elements 30, this recess being indicated by the reference numeral 38 and a helical spring 40 is adapted to be fitted into the two juxtaposed recesses of the associated heads, whereby they will be normally forced away from each other. This maintains them in locked position on the quadrant.

In every embodiment of the invention, a pivot pin 42 joins the lower ends of the locking elements 30, this pivot pin passing through the upper end of an operating arm or lever 44, which is positioned between the lower ends of the locking elements 30 or around them, and which extends downwardly for connection with a flexible shaft or other control element 46 leading to the operated device.

The lever 22 is itself pivoted at the lower extremity of its bifurcations on a shaft or bearing 48 mounted in the frame 20 and the downwardly extending connecting lever 44 has an opening therein through which the shaft 48 passes and about which the lever 44 also pivots. Another opening in this lever 44 is provided for the reception of the pin 42, which connects the lower ends of the locking elements 30.

Figure 8:
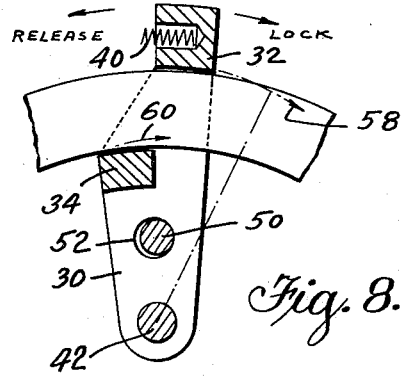
Figure 8 is an enlarged schematic view of the structure of Figure 7, showing the same in plan elevation and in unlocked position, and illustrating in more detail the actual releasing and locking movement of the associated parts.

In some of the structures, as in Figures 1, 2 and 4, another pin 50 passes through the associated locking elements and through an opening in the link 44 and also through openings provided therefor in the bifurcated portions 26 of the handle 22. As best shown in Figure 8, the openings 52 in the locking elements 30 are slightly larger than the pin 50, thereby providing for a certain amount of lost motion at this point. The pin 50 fits tightly in its openings in the bifurcations 26 and has a slotted head for ready removal, if necessary.

A rubber mounting 51 is preferably provided at the point of juncture between the pin 50 and its opening in the lever 44, whereby the handle 22 is automatically centered with respect to the lever 44 and the locking elements 30. This enables a slight movement of the handle 22 to unlock the elements 30, prior to driving the lever or link 44 through the pin 50.

The handle 22 is provided with side portions which are positioned thereon just above the quadrant 28, as best shown in Figures 1, 4, 5, 9 and 10. Set screws 56 are mounted in these lateral extensions 54 and the ends of these set screws are made to abut against the outer faces of the shoes 32 of the locking elements 30. This provides for a very fine adjustment of the relative motion between the handle 22 and the heads of the locking elements 30, necessary for unlocking.

When the handle 22 is moved by means of the knob 24, one of the set screws 56 pushes against its adjacent locking element 30 and this element is moved accordingly, the entire assembly, except the lever 44, pivoting about the pin 42. This movement also causes a corresponding movement of the other locking element and in the same direction. Such is a free sliding motion.

Figure 9:
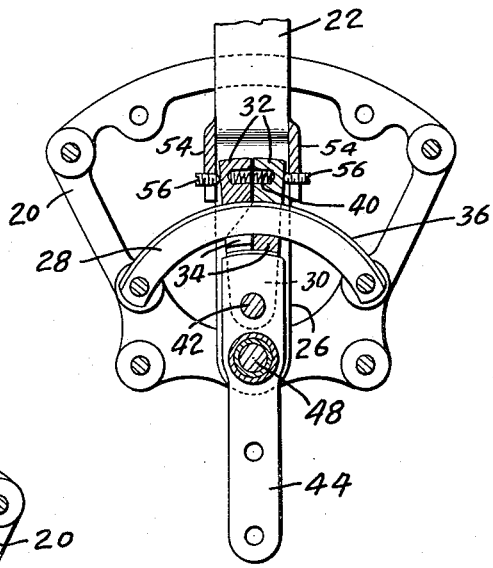
Figure 9 is a sectional view somewhat similar to the structure shown in Figure 4, but illustrating a slight modification of the invention, wherein the drive is through the faces of the lock-lugs.
Figure 10:
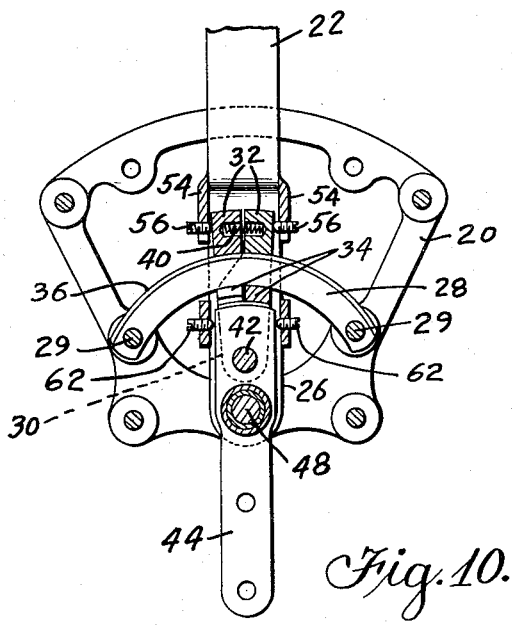
Figure 10 is a view which is also similar to both Figures 4 and 9 and which shows a further modified form, wherein the drive is through adjustable set-screws to the edge of the secondary lever.

As best shown in Figures 4, 9 and 10, when this movement is either right or left, it will be on a radius about the center of the pin 48 and the underface of the shoe 32 and the upper face of the integral extension or shoe 34 will move freely over the corresponding portions of the quadrant 28, all being on arcs of concentric circles.

However, any force applied to the lower connecting link 44 will constrain the same to pivot about the pin 48, tending to move its upper end. This will produce a sufficient tilting movement of one or the other of the locking elements so as to cause the upper shoe portion 32 to tend to move in an arc of a circle indicated by the arrow 58 in Figure 8. It will also tend to cause the integral shoe 34 of the element 30 to move in the arc of a circle indicated by the arrow 60 in this figure. In this manner a very effective locking relationship will result and no movement of the elements 30 or the lever 44 will be permitted. This action takes place because the lever arm 44 pivots about the pin 48 and the pin 42 is also fastened to the lever arm 44. Any force applied to the lower end of the lever 44 must be transmitted in the opposite direction to the elements 30 by way of the pin 42 and will tend to move these elements in an arc about the pin 42. The pin 48 is in the center of the arcs which define the upper and lower faces of the quadrant 28, being on a longer radius than the radii of the arcs 58 and 60. The bottom face of the shoe 32 and the upper face of the shoe 34 will obviously both move in arcs of circles about the center of the pin 42 as indicated by the arrows 58 and 60. These circles being of shorter radii than the radius of the quadrant 28 and also being off center with regard to the center of the circles outlining the quadrant 28, will intersect the larger circles at the points of contact of the shoes with the inner and outer faces of the quadrant, the arc 60 moving upwardly and the arc 58 downwardly from the points of intersection thereby resulting in a very positive jamming or gripping action between the shoes and the associated parts of the quadrant. Obviously, this takes place if the displacing force is in either direction, owing to the fact that there are two of the locking elements 30.

Any force exerted on the lever 44 will be first transmitted to the locking elements through the pin 42. The locking elements, being held in locked position by the spring 40, will resist any force applied through lever 44, such force being applied at the pin 42, tending to tilting or lateral motion at that point. This causes a jamming or shearing action on the quadrant 28 by the shoes 32 and 34.

In Figure 10 a different driving relationship between the parts is provided by means of adjustable set screws 62, which are mounted in plates associated with the lower end of the control arm 22, and which set screws act against the upper end or edges of the arm or lever 44. In this way, any possibility of lost motion is effectively prevented and use of the pin 50 is eliminated.

As illustrated in Fig. 17, the set screws 56a, instead of being positioned in the plates 54, are mounted directly in the blocks or shoes 32 and bear against the ends of the spring 40. This prevents any undesirable change of position of the set screws 56a, due to the friction or increased torque of the spring 40. An opening 54a is provided in each plate 54 for adjustment of the screw 56.

As illustrated in Fig. 18, the handles 22 may be extended to a length beyond the pivot 48 to accommodate a cross pin 101. Set screws 102 similar to set screws 62 are installed in the lever 44 adjacent the pin 101 and extend into an enlarged clearance hole 103 in said lever 44. In this manner, an adjustment can be had between the handle 22 and the lever 44, so far as relative motion is concerned.

In Fig. 19, in lieu of set screws 102, a rubber bushing 106 similar to the bushing 51 may be employed in this connection, as will be well understood by one skilled in this art.

Figures 11 to 16 inclusive illustrate an adaptation of the invention to a typical adjustable seat with a straight line application of the locking elements to a supporting bar or the like and obviously this construction is merely a representative one of several into which the device of this invention can be incorporated. The seat, besides being automatically locked in desired position on a horizontal support after a slidable adjustment, can also be tilted to a desired angle, depending upon the angularity of the support.

The support in these figures is indicated by the reference numeral 64, and the chair by the reference numeral 66. Rollers 68 support the chair for easier forward or backward motion and the locking arrangement which fixes the chair in any desired position on the support 64, is enclosed in a housing 70.

The locking arrangement itself comprises essentially a pair of similar juxtaposed elements 72, pivoted together at 74 and normally held slightly apart by means of a helical spring 76, similar to the spring 40.

Longitudinal vertical slots 78 are formed in the upper ends of the elements 72 and an elliptical operating shaft 80 is positioned in the two adjacent slots 78. This elliptical operating shaft is fixed between a pair of supporting plates 82 (Figure 14), and is operated by a shaft 84 and a lever arm 86. The lever arm 86 extends forwardly and is manually controlled by means of a wire or cord 88 attached to its outer end and terminating in a knob or handle 90, positioned in the arm of the chair.

As best shown in Figure 12, the device is normally locked in position when the arm 86 is horizontal, but a downward or upward movement of said arm will move it into the position shown in Figure 13, wherein the locking elements 92 will be moved away from gripping or jamming contact with the element 64 and a slidable adjustment of the seat with respect to its support can readily be made.

In Figures 15 and 16 a further modified form is illustrated wherein the locking elements each have two floating lugs or shoes acting upon opposite sides of the supporting bar 64. The lower ends of the locking elements are indicated by the reference numerals 94 and these are connected by a pivot pin 74–a. The upper ends are indicated by the reference numerals 96 and movable shoes 98 are pivoted to the respective upper and lower portions by supporting pins or the like 99. A spring 76–a acts in the same manner as the spring 76 of Figures 12, 13 and 14. The elliptical operating element 80 is the same in both cases as the arm 86.

Here again the device is normally in locked position but can be shifted to a release position by moving the arm 86 up or down.

It will be evident that there is herein provided a dependable irreversible locking control element, which is particularly adapted for use in structures where a positive immovable final fixing of related parts is desired, which setting can be changed at will and in either direction by means of a control handle or the like. This is particularly advantageous in throttles for airplane engines, wherein the speed of the engine is ordinarily set at a predetermined figure and wherein any variation from this figure will cause undesirable departure from revolutions per minute or from synchronization with other engines. The vibration of the plane does, in many cases, produce a shifting of the throttle control lever or other controls with resultant undesirable variations in operation. Additionally, the control must be such that it can be readily changed at will when necessary. This device will admirably meet such requirements.

The adjustment of the chair is shown as indicative of other applications of the structure of this invention, wherein there is produced a relatively simple apparatus composed of a minimum number of parts which is always positive in operation and not at all likely to get out of order.

Even if the locking feature of this invention fails, it can still be operated and will never jam under any circumstances. At most, the control may have to be manually held in position but it can always be moved thereby eliminating any possibility of accidents due to frozen controls.

I am aware that many changes may be made and numerous details of construction varied throughout a wide range without departing from the principles of this invention, and I, therefore, do not purpose limiting the patent granted hereon otherwise than as necessitated by the prior art.

I claim as my invention:

1. A locking control device comprising a bar, means mounting said bar, a pair of locking members coacting with said bar and moveable relative thereto, pivot means pivotally connecting said locking members together, said locking members overlapping each other and at least a portion of each being disposed on opposite sides of said bar, each said locking member having a first and a second bar contacting portion, said first contacting portions contacting one contacting surface of said bar and said second contacting portions contacting a second contacting surface of said bar, said first and second contacting surfaces comprising opposite surfaces of said bar, said first contacting portion of each locking member being located on said surface of said bar directly opposite from said second contacting portion of the other locking member, means biasing said contacting portions about an arc having said pivot means as a center into locking engagement with said contacting surfaces of said bar and control means operable to pivot said locking members about said pivot means to move said contacting portions away from locking engagement with said contacting surfaces of said bar.

2. A device according to claim 1 in which said bar is curved in quadrant shape of a greater radius of curvature than the distance from the pivot point of said pivot means to said bar.

3. A device according to claim 1 in which said locking members extend beyond said bar in a direction opposite said pivot means and are formed with aligned recesses in their extended portions and which further comprises a spring in said recesses.

4. A device according to claim 1 wherein set screws are provided for adjustment of said control means with respect to said locking members.

5. A device according to claim 1 in which said bar is shaped in a quadrant and which further comprises second pivot means pivotally mounting said control means, said second pivot means being at the center of curvature of said quadrant, a driven member also pivoted about said second pivot means, and means connecting said control means and said driven member.

6. A device according to claim 5 which further comprises first set screws for adjustment of said control means relative to said locking members and second set screws for adjustment of said control means relative to said driven member.

7. A device according to claim 5 wherein a resilient mounting is provided between said control means and said driven member.

8. A device according to claim 5 which further comprises a drive pin connecting said control means and said driven member, said driven member being formed with an aperture through which said drive pin passes, said aperture being of larger diameter than said drive pin.

9. A locking control device comprising an arcuate bar, means mounting said bar, a pair of locking members co-acting with said bar and movable relative thereto, said locking members at least partially overlapping each other and at least a portion of each being disposed on opposite sides of said bar, each said locking member having a first and a second bar contacting portion having an arcuate working surface of the same radius of curvature as the surface of said bar contacted when the device is in locked position, said first contacting portions contacting one contacting surface of said bar and said second contacting portions contacting a second contacting surface of said bar, said first and second contacting surfaces comprising opposite surfaces of said bar, said first contacting portion of each locking member being located on said surface of said bar directly opposite from said second contacting portion of the other locking member, means biasing said contacting portions into locking engagement with said contacting surfaces of said bar, control means, and means pivotally mounting said control means for movement thereof about a center common to the center of curvature of said first and second contacting surfaces of said bar, said control means being operable to move at least one of said locking members in an arcuate path having a center at the pivot point of said control means to move the contacting portions of said last-mentioned locking member out of contact with said bar.

10. A locking control device comprising a frame, a bar mounted on said frame, a pair of locking members, pivot means pivotally connecting said locking members together, said locking members overlapping each other and at least a portion of each being disposed on opposite side faces of said bar, each said locking member having a first and a second bar contacting portion, said first contacting portions contacting one edge face of said bar and said second contacting portions contacting the opposite edge face of said bar, the first bar contacting portion of each locking member lying on the opposite side of a line drawn through the center of said pivot means and normal to said bar from the second bar contacting portion of the same locking member, means biasing said contacting portions about an arc having said pivot means as a center into locking engagement with edge faces of said bar, and control means operable to pivot said locking members about said pivot means to move said contacting portions away from locking engagement with said edge faces of said bar.

11. A locking control apparatus comprising a bar, means mounting said bar, a structure coacting with said bar and movable relative thereto, and locking means for locking said structure relative to said bar, said locking means comprising a pair of locking members slidably positioned on said bar and having a position of movement in gripping relationship therewith, each said locking member having a pair of contacting portions contacting opposite contacting surfaces of said bar, a contacting portion of one locking element being located directly opposite a contacting portion of the other locking element located on the directly opposite contacting surface of said bar therefrom, means biasing said contacting portions toward locking engagement with said contacting surfaces of said bar to lock said bar and structure against movement relative to each other, and control means for moving said contacting portions into unlocking position.

12. A locking control apparatus comprising a bar, means mounting said bar, a structure coacting with said bar and movable relative thereto, and locking means for locking said structure relative to said bar, said locking means comprising a pair of locking members slidably positioned on said bar and having a position of movement in gripping relationship therewith, each said locking member having a pair of contacting portions arranged to contact opposite contacting surfaces of said bar, a contacting portion of one locking element being located directly opposite a contacting portion of the other locking element located on the directly opposite contacting surface of said bar therefrom, means biasing said contacting portions toward locking engagement with said contacting surfaces of said bar to lock said bar and structure against movement relative to each other, said locking members being formed with non-circular apertures partially aligned, and control means comprising a non-circular pin in both said apertures, means mounting said non-circular pin, and means for moving said non-circular pin in said apertures relative to said locking members to move said locking members in an arcuate path relative to each other to move said contacting portions into unlocked position.

13. A device according to claim 12 in which said means for moving said non-circular pin comprises an operating arm on which said pin is mounted, and means for pivotally mounting said operating arm to oscillate said pin.

14. A device according to claim 12 wherein each said locking member is composed of three parts, said parts being pivotally connected together.

15. A device according to claim 12 wherein each said locking member is composed of three parts, one part being intermediate the other two parts and being pivotally connected thereto, the points of pivotal connection being one on one side and the other on the other side of said bar.

16. An irreversible locking control apparatus, including a quadrant, a structure movable on the quadrant, means for always locking said structure against forces tending to move it acting from one side of the quadrant, said means also automatically releasing said structure for movement from forces on the other side of the quadrant, said means including a pair of pivoted locking elements slidably positioned on the quadrant in gripping relationship therewith and wherein each of the locking elements contacts the quadrant on both its upper and lower surfaces, and wherein the uppermost contacting portion of one locking element is opposite the lowermost contacting portion of the other element and vice versa.

17. A locking control apparatus comprising a bar, means mounting said bar, a structure movable relative to said bar, and locking means for locking said structure against forces acting from one side of said bar tending to move said structure, said locking means releasing said structure for movement by forces acting from the other side of said bar, said locking means comprising a pair of locking members slidably positioned on said bar in gripping relationship therewith and wherein each of the locking members contacts said bar on opposite surfaces thereof, and wherein the contacting surfaces of the respective locking members are diagonally oppositely disposed from one another, said locking members being positioned to at least partially overlap one another, the contacting surface of one said locking member being in a directly opposite position relative to said bar from the opposite contacting surface of the other locking member.

References Cited in the file of this patent

UNITED STATES PATENTS

| Number | Name | Date |
|---|---|---|
| 254,959 | Johnson et al. | Aug. 23, 1881 |
| 412,608 | Emerson | Oct. 8, 1889 |
| 678,252 | Handley | July 9, 1901 |
| 686,372 | Waterman | Nov. 12, 1901 |
| 686,628 | Moore | Nov. 12, 1901 |
| 692,869 | Lemp | Feb. 11, 1902 |
| 771,490 | Palmer | Oct. 4, 1904 |
| 803,046 | Bjorneby et al. | Oct. 31, 1905 |
| 980,008 | Romines | Dec. 27, 1910 |
| 1,043,206 | Custer | Nov. 5, 1912 |
| 1,905,951 | Schnakenberg | Apr. 25, 1933 |
| 2,088,880 | Strange | Aug. 3, 1937 |
| 2,131,285 | Jandus | Sept. 27, 1938 |
| 2,139,863 | Snell | Dec. 13, 1938 |
| 2,292,718 | Ryerson | Aug. 11, 1942 |
| 2,341,465 | Monnot | Feb. 8, 1944 |
| 2,458,446 | Suska | Jan. 4, 1949 |
| 2,579,305 | Cushman | Dec. 18, 1951 |
| 2,612,058 | Waite | Sept. 30, 1952 |
| 2,664,015 | Moore | Dec. 29, 1953 |

FOREIGN PATENTS

| Number | Country | Date |
|---|---|---|
| 46,227 | Switzerland | Oct. 15, 1908 |
| 810,787 | France | Jan. 6, 1937 |